(12) United States Patent
Xu

(10) Patent No.: US 11,061,434 B2
(45) Date of Patent: Jul. 13, 2021

(54) DISPLAY COVER AND MANUFACTURING METHOD THEREOF

(71) Applicant: WUHAN CHINA STAR OPTOELECTRONICS SEMICONDUCTOR DISPLAY TECHNOLOGY CO., LTD., Hubei (CN)

(72) Inventor: Feng Xu, Hubei (CN)

(73) Assignee: WUHAN CHINA STAR OPTOELECTRONICS SEMICONDUCTOR DISPLAY TECHNOLOGY CO., LTD., Hubei (CN)

(*) Notice: Subject to any disclaimer, the term of this patent is extended or adjusted under 35 U.S.C. 154(b) by 0 days.

(21) Appl. No.: 16/499,271

(22) PCT Filed: Mar. 18, 2019

(86) PCT No.: PCT/CN2019/078486
§ 371 (c)(1),
(2) Date: Sep. 29, 2019

(87) PCT Pub. No.: WO2020/133730
PCT Pub. Date: Jul. 2, 2020

(65) Prior Publication Data
US 2020/0225697 A1    Jul. 16, 2020

(51) Int. Cl.
| | | |
|---|---|---|
| *C03B 29/00* | (2006.01) | |
| *C03B 23/203* | (2006.01) | |
| *G06F 1/16* | (2006.01) | |
| *G09F 9/30* | (2006.01) | |
| *C03B 25/00* | (2006.01) | |
| *B32B 37/12* | (2006.01) | |
| *B32B 17/10* | (2006.01) | |

(52) U.S. Cl.
CPC ........ *G06F 1/1601* (2013.01); *B32B 17/1099* (2013.01); *B32B 17/10807* (2013.01); *B32B 37/12* (2013.01); *C03B 25/00* (2013.01); *G09F 9/301* (2013.01); *B32B 2037/1253* (2013.01)

(58) Field of Classification Search
CPC ............................. C03B 23/203; C03B 29/00
See application file for complete search history.

(56) References Cited

U.S. PATENT DOCUMENTS

| | | | |
|---|---|---|---|
| 2003/0180547 A1* | 9/2003 | Buhay | C03C 17/3613 428/434 |
| 2014/0093702 A1* | 4/2014 | Kitajima | C03B 23/0252 428/174 |
| 2016/0207825 A1* | 7/2016 | Black | C03C 21/002 |
| 2017/0247288 A1* | 8/2017 | Curran | C03C 17/32 |

* cited by examiner

*Primary Examiner* — Cynthia Szewczyk
(74) *Attorney, Agent, or Firm* — Mark M. Friedman

(57) ABSTRACT

A display cover is provided. The display cover includes a first glass and a second glass; a carbon material layer disposed between the first glass and the second glass, wherein the carbon material layer is formed by simultaneously applying a heat treatment process to an organic adhesive layer, the first glass, and the second glass to carbonize the organic adhesive layer. The structural strength of display cover can be strengthened by placing a carbon material layer between two glass layers to achieve a strong chemical bond between the thin carbon material layer disposed between the two glass layers and the two glass layers.

9 Claims, 2 Drawing Sheets

DISPLAY COVER AND MANUFACTURING METHOD THEREOF

FIELD OF INVENTION

The present invention relates to a display cover and a manufacturing method thereof, and more particularly to a display cover that simultaneously improves bending performance and protective performance of the display cover and a manufacturing method thereof.

BACKGROUND OF INVENTION

In recent years, display applications have become more and more popular and more diverse. A display typically uses glass as an outermost protective layer of the entire display to protect the entire device. Flexible displays have advantages of low power consumption, no backlight, smaller size and light weight, and its application requirements are also increasing. However, the glass protective layer currently used in general displays cannot satisfy the flexible organic light emitting diode (OLED) display because the conventional glass does not have good bending properties.

TECHNICAL PROBLEM

Currently, flexible OLED displays consider use of harder organic material instead of glass as the outermost material, but there are two problems encountered: different materials need to be developed for inward bending and outward bending; balance of performance is difficult trade-off, material with good bending properties often do not have good strength to protect the entire device.

Therefore, it is necessary to provide a display cover and a manufacturing method thereof to solve the problems existing in the conventional art.

SUMMARY OF INVENTION

In view of above, the present invention provides a display cover and a manufacturing method thereof, which solve a problem that bending performance and protective performance of a display protective layer existing in the conventional art cannot be satisfactory to both parties.

A main object of the present invention is to provide a display cover and a manufacturing method thereof that can improve the problem that the bending performance and the protective performance of the display protective layer of the display cannot be satisfactory to both parties.

A secondary object of the present invention is to provide a display cover and a manufacturing method thereof, which can simultaneously apply a heat treatment to an organic adhesive layer carbonize by heat treating an organic adhesive layer, a first glass, and a second glass, so that the organic adhesive material is carbonized to form a carbon material layer disposed between the two glass layers, and deposit carbon to a first surface of the first borosilicate glass, and a second surface of the second borosilicate glass, such that the first surface and the second surface respectively form a carbon deposition layer, so that achieve a strong chemical bond between the thin carbon material layer and the two glass layers, thereby improving the bending performance and protective performance of the display cover together.

In order to achieve the foregoing objects of the present invention, an embodiment of the present invention provides a manufacturing method of a display cover, including steps of:

providing a first borosilicate glass;

disposing a thermosetting resin layer on the first borosilicate glass;

providing a second borosilicate glass to laminate the first borosilicate glass and the second borosilicate glass together by the thermosetting resin layer; and applying a heat treatment process to the first borosilicate glass, the thermosetting resin layer, and the second borosilicate glass after laminated together, such that the thermosetting resin layer is carbonized to form a carbon material layer.

In an embodiment of the present invention, the manufacturing method of the display cover includes step of: depositing carbon to a first surface of the first borosilicate glass, and a second surface of the second borosilicate glass, such that the first surface and the second surface respectively form a carbon deposition layer.

In an embodiment of the present invention, each of the carbon material layer and the carbon deposition layers includes at least three layers of carbon atoms, a crystal lattice of one of the at least three layers of carbon atoms and a crystal lattice of another of the at least three layers of carbon atoms are staggeredly arranged.

In an embodiment of the present invention, the carbon deposition layer is a graphene layer.

Moreover, another embodiment of the present invention further provides a manufacturing method of a display cover, including steps of:

providing a first glass;

disposing an organic adhesive layer on the first glass;

providing a second glass to laminate the first glass and the second glass together by the organic adhesive layer; and applying a heat treatment process to the first glass, the organic adhesive layer, and the second glass after laminated together, such that the organic adhesive layer is carbonized to form a carbon material layer.

In an embodiment of the present invention, the manufacturing method of the display cover includes step of: depositing carbon to a first surface of the first glass, and a second surface of the second glass, such that the first surface and the second surface respectively form a carbon deposition layer.

In an embodiment of the present invention, each of the carbon material layer and the carbon deposition layers includes at least three layers of carbon atoms, a crystal lattice of one of the at least three layers of carbon atoms and a crystal lattice of another of the at least three layers of carbon atoms are staggeredly arranged.

In an embodiment of the present invention, the first glass is a first borosilicate glass, the second glass is a second borosilicate glass, and the carbon deposition layer is a graphene layer.

In an embodiment of the present invention, the organic adhesive layer is a thermosetting resin layer.

Furthermore, yet another embodiment of the present invention provides a display cover, including:

a first glass and a second glass; and a carbon material layer disposed between the first glass and the second glass, wherein the carbon material layer is formed by simultaneously applying a heat treatment process to an organic adhesive layer, the first glass, and the second glass to carbonize the organic adhesive layer.

In an embodiment of the present invention, the display cover includes: a first carbon deposition layer disposed on a first surface of the first glass; and a second carbon deposition layer disposed on a second surface of the second glass.

In an embodiment of the present invention, each of the carbon material layer, the first carbon deposition layer, and the second carbon deposition layer includes at least three layers of carbon atoms, a crystal lattice of one of the at least three layers of carbon atoms and a crystal lattice of another of the at least three layers of carbon atoms are staggeredly arranged.

In an embodiment of the present invention, the first glass and the second glass are borosilicate glass; and the carbon deposition layer is a graphene layer.

In an embodiment of the present invention, the organic adhesive layer is a thermosetting resin layer.

BENEFICIAL EFFECT

Compared with the conventional art, the display cover of the present invention and the manufacturing method thereof, which can simultaneously apply a heat treatment to an organic adhesive layer carbonize by heat treating an organic adhesive layer, a first glass, and a second glass, so that the organic adhesive material is carbonized to form a carbon material layer disposed between the two glass layers, and deposit carbon to a first surface of the first borosilicate glass, and a second surface of the second borosilicate glass, such that the first surface and the second surface respectively form a carbon deposition layer, so that achieve a strong chemical bond between the thin carbon material layer and the two glass layers, thereby improving the bending performance and protective performance of the display cover together.

DRAWINGS

In order to make the above description of the present invention more comprehensible, the preferred embodiments are described below, and in conjunction with the accompanying drawings, the detailed description is as follows.

DETAILED DESCRIPTION OF EMBODIMENTS

The following description of the various embodiments is provided to illustrate the specific embodiments of the invention. Furthermore, the directional terms mentioned in the present invention, such as upper, lower, top, bottom, front, rear, left, right, inner, outer, side, surrounding, central, horizontal, horizontal, vertical, longitudinal, axial, radial, uppermost or lowermost, etc., only refer to the direction of the additional schema. Therefore, the directional terminology used is for the purpose of illustration and understanding of the invention.

Figure 1:
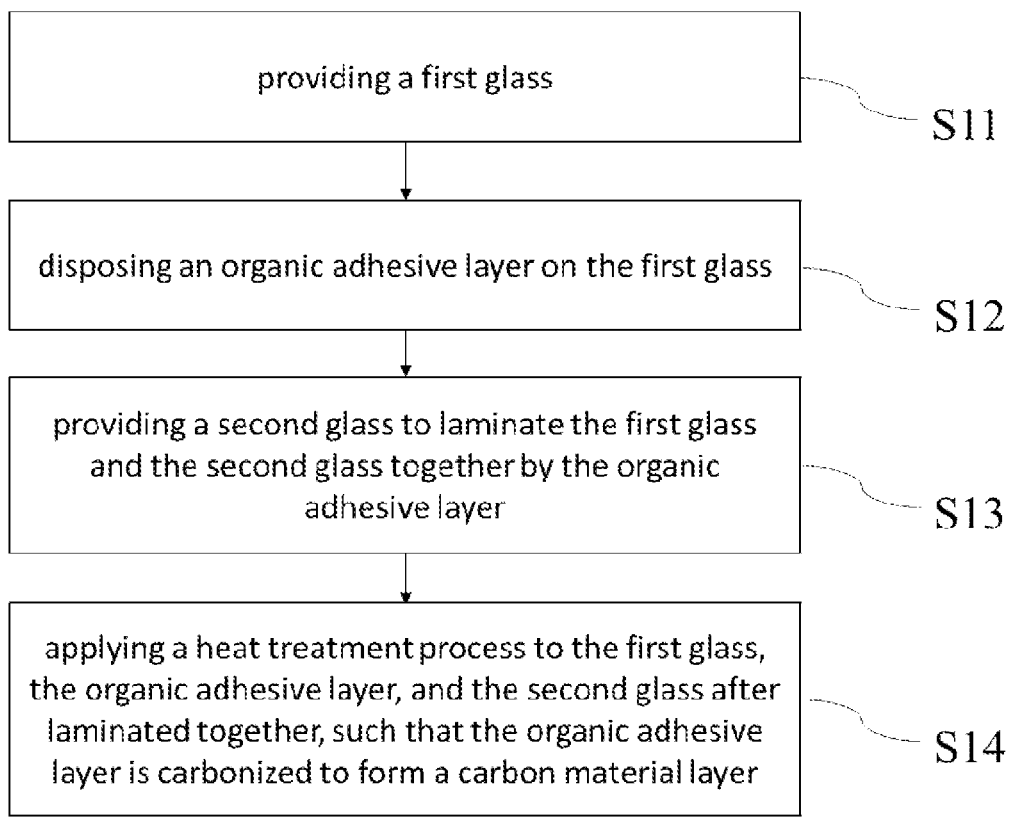
FIG. 1 is a schematic flow chart showing a manufacturing method of a display cover according to an embodiment of the present invention.

Referring to FIG. 1, embodiments of the present invention in order to archive the foregoing objects of the present invention, a display cover and a manufacturing method thereof are provided. The manufacturing method od the display cover includes steps of: (S11) providing a first glass; (S12) disposing an organic adhesive layer on the first glass; (S13) providing a second glass to laminate the first glass and the second glass together by the organic adhesive layer; and (S14) applying a heat treatment process to the first glass, the organic adhesive layer, and the second glass after laminated together, such that the organic adhesive layer is carbonized to form a carbon material layer. The heat treatment causes the organic adhesive layer to be carbonized to form a layer of carbon material.

Figure 2:
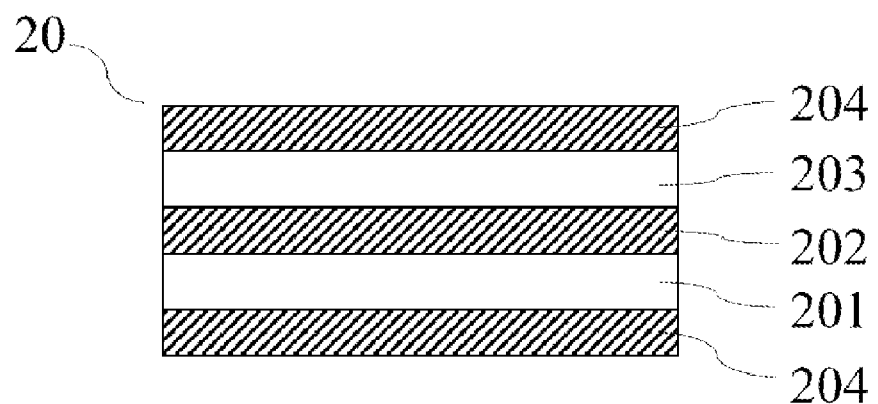
FIG. 2 is a cross-sectional view of a display cover according to an embodiment of the present invention.

FIG. 2 shows a cross-sectional view of a display cover 20 according to an embodiment of the present invention. Referring to the step S11 of FIG. 1 and FIG. 2, a first glass 201 is provided. Preferably, the first glass 201 is a borosilicate glass.

Next, referring to the step S12 of FIG. 1 and FIG. 2, an organic adhesive layer is disposed on the first glass 201. Optionally, the organic adhesive layer is a thermosetting resin layer. Optionally, the organic adhesive layer has a thickness ranging from 0.6 nm to 5 nm.

Referring to the step S13 of FIG. 1, a second glass 203 is provided, the first glass 201 and the second glass 203 are laminated together by the organic adhesive layer. Preferably, the first glass 201 is a borosilicate glass. Optionally, a curing process is applied to the first glass 201 and the second glass 203 laminated together by the organic adhesive layer, so that the organic adhesive layer is cured.

Referring to the step S14 of FIG. 1 and FIG. 2, the first glass 201, the organic adhesive layer, and the second glass 203 after laminated together are applied a heat treatment process, such that the organic adhesive layer is carbonized to form a carbon material layer 202. Optionally, when the heat treatment is applied, the organic adhesive layer acts as a carbon source of the carbon material layer 202 without additionally adding other carbon sources. Optionally, the carbon material layer 202 has 2-10 layers of carbon atoms.

Optionally, in the embodiment of the present invention, the manufacturing method of the display cover 20 further includes step of: depositing carbon to a first surface of the first glass 201, and a second surface of the second glass 203, such that the first surface and the second surface respectively form a carbon deposition layer 204. Because carbon and silicon are the same group neighborhood elements and have similar chemical properties, they are prone to create a strong chemical bonding. The carbon deposition layer 204 is deposited while the first glass 201 and the second glass 203 are strongly chemically bonded to the carbon material layer 202. The carbon material layer 202 can change the stress distribution in the structure when the display is bent. The carbon deposition layer 204 of the second surface of the second glass 203 can improve the wear resistance of the entire display cover 20 structure and prevent scratches. The carbon deposition layer 204 of the first surface of the first glass 201 can improve the ability of the display cover 20 to bond with other structures of the underlying layer. The carbon material layer 202 and the carbon deposition layer 204 are light transmissive, so that light generated by the display elements disposed under the display cover 20 can be transmitted through the display cover 20.

Figure 3:
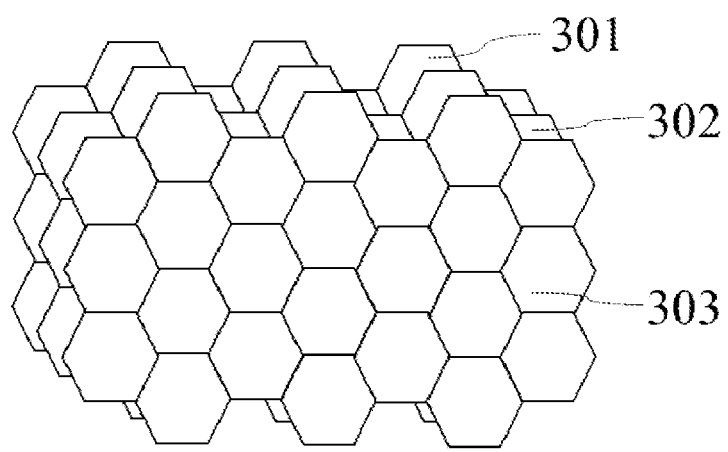
FIG. 3 is a schematic view showing a multilayer structure of a carbon material layer and carbon deposition layers in a display cover according to an embodiment of the present invention.

Referring to FIG. 3, FIG. 3 is a schematic view showing a multilayer structure of a carbon material layer 202 and carbon deposition layers 204 in a display cover 20 according to an embodiment of the present invention. Each of the carbon material layer 202 and the carbon deposition layers 204 includes at least three layers of carbon atoms 301, 302, 303, and a crystal lattice of one of the at least three layers of carbon atoms 301, 302, 303 and a crystal lattice of another of the at least three layers of carbon atoms are staggeredly arranged.

Furthermore, another embodiment of the present invention provides a display cover, including:

a first glass and a second glass; and a carbon material layer disposed between the first glass and the second glass, wherein the carbon material layer is formed by simultaneously applying a heat treatment process to an organic adhesive layer, the first glass, and the second glass to carbonize the organic adhesive layer. Optionally, the display cover includes: a first carbon deposition layer disposed on a first surface of the first glass; and a second carbon deposition layer disposed on a second surface of the second glass. Optionally, each of the carbon material layer, the first carbon deposition layer, and the second carbon deposition layer includes at least three layers of carbon atoms, a crystal lattice of one of the at least three layers of carbon atoms and a crystal lattice of another of the at least three layers of carbon atoms are staggeredly arranged. Optionally, the first glass and the second glass are borosilicate glass; and the carbon deposition layer is a graphene layer. Optionally, the organic adhesive layer is a thermosetting resin layer.

As described above, compared with the problem existing in the conventional art that the bending performance and the protective performance of the display protective layer of the display cannot be satisfactory to both parties. The display cover and the manufacturing method thereof according to the present invention, which can simultaneously apply a heat treatment to an organic adhesive layer carbonize by heat treating an organic adhesive layer, a first glass, and a second glass, so that the organic adhesive material is carbonized to form a carbon material layer disposed between the two glass layers, and deposit carbon to a first surface of the first borosilicate glass, and a second surface of the second borosilicate glass, such that the first surface and the second surface respectively form a carbon deposition layer, so that achieve a strong chemical bond between the thin carbon material layer and the two glass layers, thereby improving the bending performance and protective performance of the display cover together.

The present invention has been described by the above related embodiments, but the above embodiments are merely examples for implementing the present invention. It must be noted that the disclosed embodiments do not limit the scope of the invention. Rather, modifications and equivalent arrangements are intended to be included within the scope of the invention.

The invention claimed is:

1. A manufacturing method of a display cover, comprising steps of:
   providing a first borosilicate glass;
   disposing a thermosetting resin layer on the first borosilicate glass;
   providing a second borosilicate glass to laminate the first borosilicate glass and the second borosilicate glass together by the thermosetting resin layer; and
   applying a heat treatment process to the first borosilicate glass, the thermosetting resin layer, and the second borosilicate glass after laminated together, such that the thermosetting resin layer is carbonized to form a carbon material layer.

2. The manufacturing method of the display cover according to claim 1, wherein the manufacturing method of the display cover comprises step of:
   depositing carbon to a first surface of the first borosilicate glass, and a second surface of the second borosilicate glass, such that the first surface and the second surface respectively form a carbon deposition layer.

3. The manufacturing method of the display cover according to claim 2, wherein each of the carbon material layer and the carbon deposition layers comprises at least three layers of carbon atoms, a crystal lattice of one of the at least three layers of carbon atoms and a crystal lattice of another of the at least three layers of carbon atoms are staggeredly arranged.

4. The manufacturing method of the display panel according to claim 2, wherein the carbon deposition layer is a graphene layer.

5. A manufacturing method of a display cover, comprising steps of:
   providing a first glass;
   disposing an organic adhesive layer on the first glass;
   providing a second glass to laminate the first glass and the second glass together by the organic adhesive layer; and
   applying a heat treatment process to the first glass, the organic adhesive layer, and the second glass after laminated together, such that the organic adhesive layer is carbonized to form a carbon material layer.

6. The manufacturing method of the display cover according to claim 5, wherein the manufacturing method of the display cover comprises step of:
   depositing carbon to a first surface of the first glass, and a second surface of the second glass, such that the first surface and the second surface respectively form a carbon deposition layer.

7. The manufacturing method of the display cover according to claim 6, wherein each of the carbon material layer and the carbon deposition layers comprises at least three layers of carbon atoms, a crystal lattice of one of the at least three layers of carbon atoms and a crystal lattice of another of the at least three layers of carbon atoms are staggeredly arranged.

8. The manufacturing method of the display panel according to claim 6, wherein the first glass is a first borosilicate glass, the second glass is a second borosilicate glass, and the carbon deposition layer is a graphene layer.

9. The manufacturing method of the display panel according to claim 5, wherein the organic adhesive layer is a thermosetting resin layer.

* * * * *